(12) United States Patent
Goddard

(10) Patent No.: US 6,206,422 B1
(45) Date of Patent: Mar. 27, 2001

(54) CAB SUSPENSION FOR AN AGRICULTURAL VEHICLE

(75) Inventor: Roger W. Goddard, Essex (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/092,440

(22) Filed: Jun. 5, 1998

(30) Foreign Application Priority Data

Jun. 6, 1997 (GB) ................................................ 9711687.5

(51) Int. Cl.$^7$ ........................................................ B62D 7/22
(52) U.S. Cl. .............................................................. 280/788
(58) Field of Search ........................ 280/788; 180/89.12, 180/89.13, 89.14, 89.15, 89.16, 89.19, 900, 326, 327, 328, 331; 172/439, 448

(56) References Cited

U.S. PATENT DOCUMENTS

| 4,043,584 | * | 8/1977 | Wagner et al. | 296/35 |
| 4,440,437 | * | 4/1984 | Hahm et al. | 296/190 |
| 4,558,881 | * | 12/1985 | Manteufel | 280/460 |
| 4,776,606 | * | 10/1988 | Stephenson et al. | 280/415 A |
| 4,805,322 | * | 2/1989 | Lemire et al. | 37/118 R |
| 4,817,730 | * | 4/1989 | Winter | 172/328 |
| 5,346,018 | * | 9/1994 | Koster | 172/47 |
| 5,404,958 | * | 4/1995 | Weiss | 172/439 |
| 5,458,359 | * | 10/1995 | Brandt | 280/673 |

FOREIGN PATENT DOCUMENTS

| 0121968 | 10/1984 | (EP) . |
| 1244296 | 8/1971 | (GB) . |
| 1403751 | 8/1975 | (GB) . |
| 1485350 | 9/1977 | (GB) . |
| 2129379 | 5/1984 | (GB) . |
| 8703259 | 6/1987 | (WO) . |
| 9308065 | 4/1993 | (WO) . |

\* cited by examiner

Primary Examiner—Brian L. Johnson
Assistant Examiner—Tony Winner
(74) Attorney, Agent, or Firm—J. William Stader; Larry W. Miller

(57) ABSTRACT

An agricultural vehicle is described having a chassis and a cab mounted on the chassis. The fore end of the cab is mounted on the chassis for pivotal movement about a transverse axis but is prevented from moving relative to the chassis in a vertical plane. The aft end of the cab is resiliently supported on the chassis by springs and is connected to the chassis by means of a linkage, preferably a Watts linkage, that permits movement of the aft end of the cab in a vertical direction towards and away from the chassis while preventing transverse movement of the aft end of the cab.

10 Claims, 2 Drawing Sheets

CAB SUSPENSION FOR AN AGRICULTURAL VEHICLE

BACKGROUND OF THE INVENTION

The present invention relates to an agricultural vehicle having a cab resiliently supported on the chassis of the vehicle.

Conventionally, agricultural vehicles, such as tractors, include a chassis rigidly connected to the vehicle wheels. Because it is unsprung, the vehicle chassis follows the contour of the ground. It is common for the cab, or operator station, to be mounted directly on the chassis and to rely only on springing in the operator's seat to improve operator comfort. This however is not entirely satisfactory and it has therefore been proposed to support the cab on rubber mounts that provide an improved degree of cushioning.

A further suspension system, disclosed in U.S. Pat. No. 4,043,584, enables the cab to be resiliently mounted on the vehicle chassis. In the latter proposal, stabilizer linkages are provided on the tractor fore and aft of the cab to limit the movement of the pivotal connection of the stabilizer linkages to the cab to essentially a vertical movement which lies in a vertical plane including the longitudinal centers of the vehicle chassis and the cab. A sway or yaw limiting mechanism as well as a pitch limiting mechanism are provided to limit the pitch and roll of the cab as it moves through the vertical plane relative to the vehicle chassis.

The present invention seeks to provide an agricultural vehicle with cab suspension that has a less complex and less costly suspension geometry.

SUMMARY OF THE INVENTION

According to the present invention, there is provided an agricultural vehicle having a chassis and a cab mounted on the chassis, wherein the fore end of the cab is mounted on the chassis for pivotal movement about a transverse axis but is prevented from moving relative to the chassis in a vertical plane, and the aft end of the cab is resiliently supported on the chassis and is connected to the chassis by means of a linkage that permits movement of the aft end of the cab in a vertical direction towards and away from the chassis while preventing transverse movement of the aft end of the cab.

The terms "fore", "aft" and "transverse" as used herein are all referenced to the longitudinal centerline of the chassis with the vehicle moving in a forward direction. The term "vertical" refers herein to the direction perpendicular to the rear wheel axle, i.e. the normal to the plane of contact of the wheels with the ground. The term "plumb vertical" is used to mean true vertical as would be indicated by a plumb line. The terms "pitch", "yaw" and "roll" are likewise referenced to the longitudinal axis of the chassis, roll being rotation of the cab about a longitudinal axis, pitch about a transverse axis and yaw about a vertical axis.

As opposed to the cab suspension described in U.S. Pat. No. 4,043,584, which allows both the fore and aft ends of the cab to move vertically relative to the chassis, the suspension of the present invention fixes the fore end and only allows movement of the aft end of the cab. In other words, the cab in the present invention can pivot at its fore end about a transverse axis but cannot, as a whole, move vertically on the chassis without pitching.

The invention recognizes that the operator seat is located well back in the cab and it is at the back of the cab that movement is required to provide operator comfort. The fore end of the cab on the other hand contains the steering and other control mechanisms and allowing vertical movement of the cab at its fore end merely introduces complexity without offering any particular advantage from the point of view of shock isolation.

The movement of the aft end of the cab in relation to the chassis may be constrained to the vertical direction by the use of any suitable form of linkage. For example, a roller may be fixed on the cab to follow a linear track fixed to the chassis. In the preferred embodiment of the invention, however, a Watts linkage is used to connect the aft end of the cab to the chassis.

The Watts linkage preferably comprises a relatively short double arm lever rotatably mounted on the chassis and two relatively long levers extending in opposite directions from the ends of the double arm lever to pivot points fixed to opposite sides of the cab.

It is advantageous for the shorter lever to be vertical and the two longer levers to be substantially horizontal when the vehicle is at rest on a level surface.

It is preferred for the mounting at the fore end of the cab to be a gimbal mounting that allows the cab to roll and pitch relative to the chassis and to provide a generally transversely extending rod (herein termed a Panhard rod) connected at its one end to the chassis and at its other end to a point on the cab. If the Panhard rod is of variable length, then by shortening and lengthening the effective length of the rod, the cab can intentionally be made to roll relative to the chassis. If a level sensing means is provided in the cab, then its output signal can be used to set the length of the Panhard rod so that the cab may remain plumb vertical when one wheel of the vehicle is in a furrow or when driving along a banked surface.

The effective length of the Panhard rod may in this case be varied by rotating a lever or an eccentric connecting one end of the rod to the chassis or to the cab.

The aft end of the cab may be resiliently supported on the chassis by means of two springs located under the aft end of the cab. Damping of oscillations can be effected by means of hydraulic shock absorbers within the springs or by means of rubber bushes built into the various pivots of the Watts linkage.

It is also possible to incorporate a spring and damper into the Panhard rod to allow some degree of damped roll as the vehicle is being driven.

The present invention also provides, in accordance with a second aspect, an agricultural vehicle having a chassis, lifting equipment, and a cab mounted on the chassis, wherein one end of the cab is mounted on the chassis for pivotal movement about a transverse axis but is prevented from moving relative to the chassis in a vertical plane and the other end of the cab is releasably supported on the chassis, wherein coupling means are provided on the said other end of the cab for connection to the lifting equipment of the vehicle, Lo permit the cab to be pivoted about its said one end relative to the chassis by the action of the lifting equipment.

The provision of a fixed pivot at one end of the cab, preferably its fore end, allows the cab to be tilted away from the chassis to provide access for servicing and maintenance. The second aspect of the invention allows advantage to be taken of such a cab suspension geometry and the existence of lifting equipment on the vehicle, to simplify the task of gaining access to components of the chassis lying beneath the cab. In particular, it is possible to attach the adjustable top link of a three point hitch of a tractor to its cab to support the weight of the cab as it is disconnected at its other end from the chassis.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
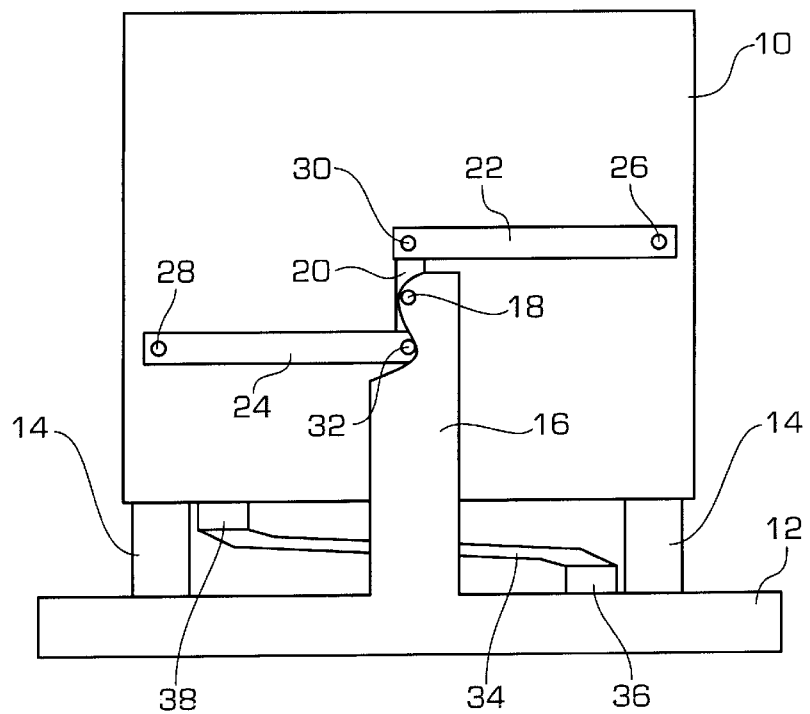
FIG. 1 is a schematic representation of the cab of an agricultural vehicle of the invention as viewed from the rear of the cab.
Figure 2:
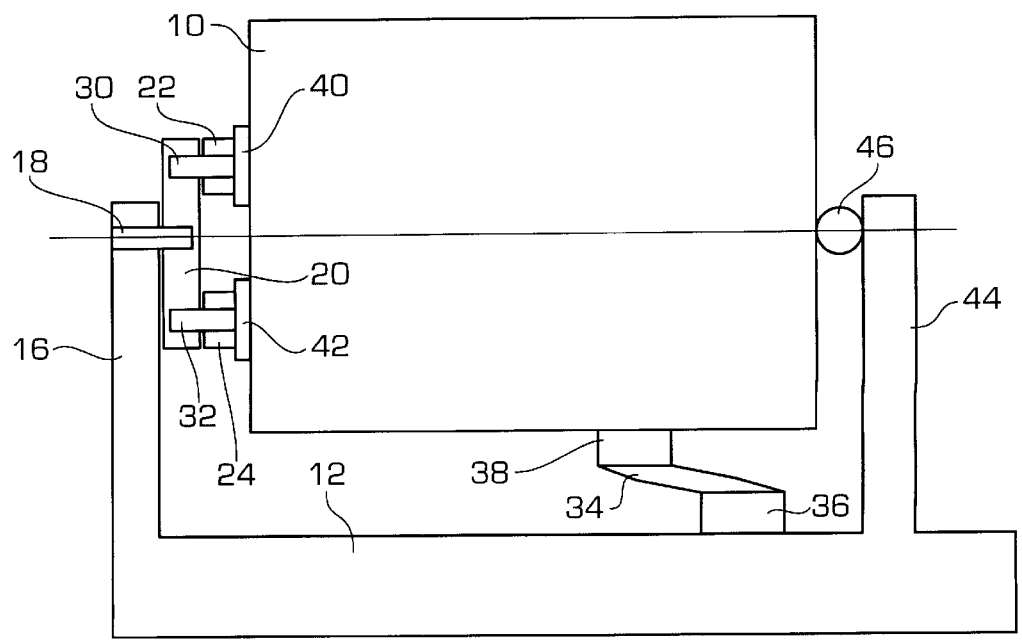
FIG. 2 is a schematic representation of the cab of FIG. 1 as viewed from the right of the vehicle.

FIGS. 1 and 2 show part of a tractor, namely the cab 10 and part of the chassis 12. The term chassis refers to the entire unsprung mass of the tractor which in addition to the rear wheel axle commonly includes the engine and the transmission. The cab 10 is suspended from posts 16 and 44 that extend upwards from the chassis 12.

As best seen in FIG. 2, the cab 10 is mounted on the post 44 that lies at its fore end by means of a coupling 46, represented by a ball, that allows the cab to pivot in all directions about the center of the coupling. The coupling 46 is however fixed on the cab 10 and on the post 44 and prevents the fore end of the cab 10 from moving vertically or transversely relative to the post 44.

At its aft end, the cab 10 is supported on the chassis 12 by means of springs 14. The cab 10 is also connected to the post 16 arranged at its aft end by means of a Watts linkage, shown in FIG. 1. The Watts linkage, which has been exposed by cutting away a part of the post 16 and is described in greater detail below, allows the aft end of the cab 10 to move up and down relative to the chassis 12 while preventing it from moving from side to side. In other words, the linkage allows pitching of the cab 10 relative to the chassis 10 but prevents yaw.

The Watts linkage comprises a short lever 20 that is pivotably mounted at its center on the post 16 by means of a pivot pin 18. The lever 20 is substantially vertical when the vehicle is at rest on a level surface. Each of the free ends of the lever 20 is pivotably connected by respective pivot pins 30 and 32 to two long levers 22 and 24. The other ends of the long levers 22 and 24 are pivotably connected to opposite sides of the cab 10 by respective pivot pins 26 and 28. Some or all of the various pivots of the Watts linkage incorporate rubber bushes, designated 40 and 42 in FIG. 2, to damp the oscillation of the cab 10 on the chassis 12.

As also shown in FIG. 2, the coupling 46 and the central pivot pin 18 of the short lever 20 of the Watts linkage lie on a line with each other so that the cab 10 can roll about this fore/aft axis, which preferably passes through the center of gravity of the cab 10. Such roll movement is prevented by means of a Panhard rod 34 that is connected by suitable pivot joints 36 and 38 to the chassis 12 and the cab 10 respectively.

Forces acting on the cab 10 to move it from side to side are transmitted by the long horizontal levers 22 and 24 to the opposite ends of the short vertical lever 20. As lateral movement of the short lever 20 is prevented by the connection pin 18, lateral movement of the entire cab is prevented by the Watts linkage. Vertical movement of the cab relative to the chassis, on the other hand, is permitted by the Watts linkage, as downward movement requires a clockwise rotation of the lever 22 and an counterclockwise rotation of the lever 24 while upwards movement requires a counterclockwise rotation of the lever 22 and clockwise rotation of the lever 24. The lever 20 rotates clockwise in both directions of movement of the cab away from its neutral central position, in which the levers 22 and 24 are horizontal. In this manner, the cab can remain substantially stationary in relation to the ground while the wheels of the chassis follow the contours of the ground. The vertical movement of the cab is accompanied by a slight amount of roll which depends on the relative lengths of the short and long levers which in practice can be minimal. If the Panhard rod 34 incorporates a spring and a damper then it will allow damped roll movement of the cab 10 and the chassis 12.

As an alternative to the Watts linkage, any alternative means may be used to constrain the aft end of the cab 10 to move only in a vertical direction and withstand lateral forces.

When the vehicle is driven over uneven ground, the aft end only of the cab 10 will move vertically while supported on the springs 14 and prevent shocks from being transmitted to the operator's seat that is located towards the rear of the cab 10. The fore end of the cab 10 will however move vertically with the chassis as the cab pitches about the coupling 46.

In the embodiment of FIGS. 1 and 2, the cab 10 always remains perpendicular to the road wheel axle but this is not always desirable. For example, when the vehicle is working on a banked surface, or has one wheel in a furrow, it is preferred for the cab to remain plumb vertical.

Figure 3:
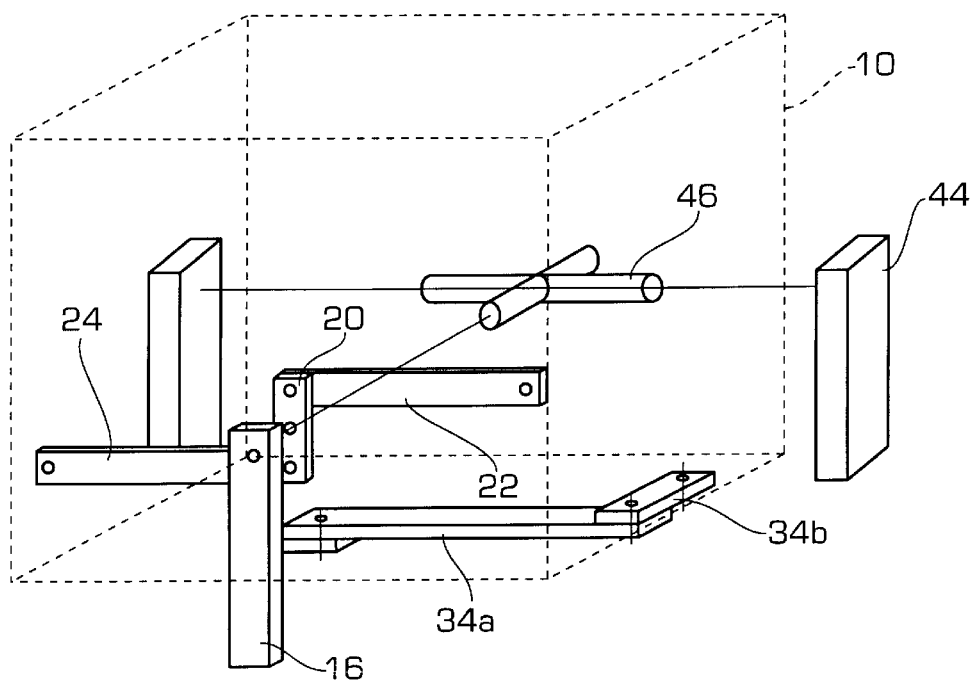
FIG. 3 is a schematic representation of a vehicle having an alternative cab suspension, viewed in perspective.

This is achieved in the embodiment of FIG. 3 by using a Panhard rod of variable effective length. The rod in this case comprises a first long lever 34a and a second shorter lever 34b (which may alternatively be an eccentric) that is rotatably mounted on the cab 10, as shown in FIG. 3, or alternatively on the chassis. If the lever 34b is rotated clockwise as viewed from above in FIG. 3, the effective length of the Panhard rod is increased and this causes the cab 10 to rotate about the roll axis in an counterclockwise direction as viewed from the aft end of the cab 10. The cab incorporates a level sensor (not shown), which may for example be a mercury switch, the output of which is used by a suitable control system to set the position lever 34b to ensure automatic self-levelling of the cab 10.

This embodiment also shows an alternative construction of the coupling 46, which in this case is formed as a gimbal mount. A transverse rod pivotably mounted in two posts 44 arranged at the fore end of the cab 10 is connected to the cab at its center by a longitudinally extending pivot pin. In this way, the cab 10 can roll about the longitudinal pivot and pitch by rotation of the transverse rod in the vertical posts 44. The front coupling 46 therefore allows pivoting about only two axes and it assists the linkage at the aft end of the cab 10 in resisting yaw.

Figure 4:
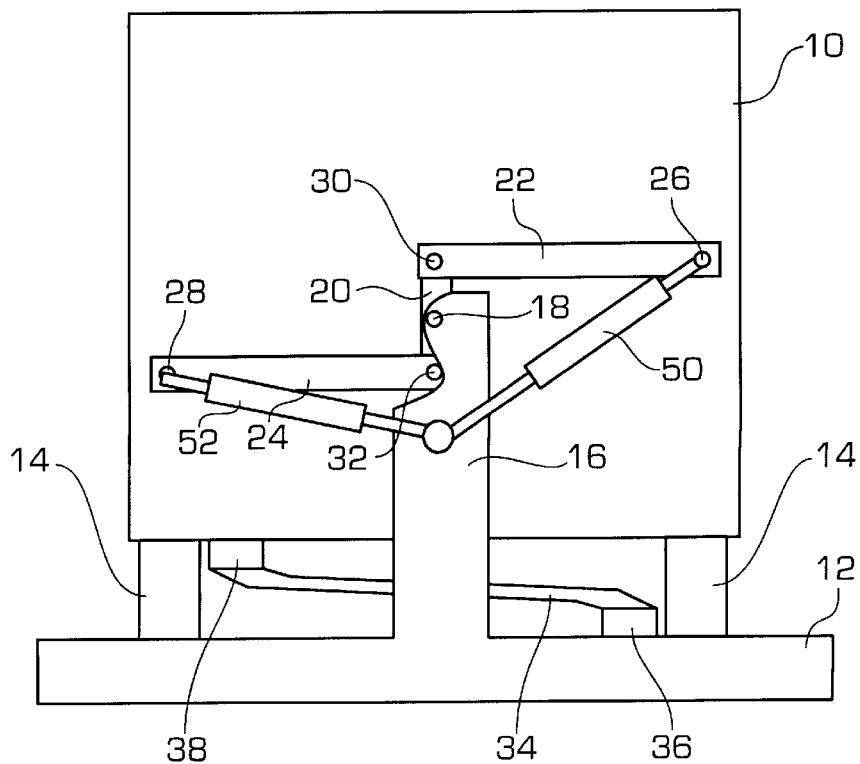
FIG. 4 is a similar view to that of FIG. 1 showing an alternative embodiment using gas struts in place of resilient bushes to damp oscillations of the cab on the chassis.

The embodiment of FIG. 4 shows and alternative means of damping oscillations of the cab 10. While it is possible to rely on dampers incorporated in the pivots of the Watts linkage and in the spring 14, a further possibility is to provide gas struts 50 and 52 or hydraulic dampers between the post 16 and the cab 10.

An advantage of the suspension geometry of the cab in a vehicle of the invention is that the cab can readily be tilted forwards to allow access to components of the chassis for servicing. In particular, if the pin 18 and the Panhard rod 34 are disconnected, the entire cab can be tilted about its fore end on the coupling 46.

In the case of a vehicle having its own lifting equipment, such as a tractor with a three point hitch, it is particularly advantageous in accordance with the second aspect of the present invention to use the vehicle's lifting equipment to support the weight of the cab 10 while its aft end is released from the chassis and to tilt the cab after it has been released from the chassis, to allow access to components lying beneath it for servicing and maintenance. For this purpose, it is advantageous to provide on the rear of the cab a coupling or anchorage point for attachment to the top link of a three point hitch. The length of the top link can then be adjusted mechanically or hydraulically first to support the weight of the aft end of the cab then to raise it off the chassis.

It is possible to use an extension of the pivot 18 as an anchorage point for the top link of the three point hitch. In this case, the post 16 may include two separable parts that allow the pin 18 to be raised off the post 16 after they have been separated from one another. The pin 18 may for example be held captive between the top of the post and a clamping block that may be removed from the post 16 or pivoted relative to the post 16 out of the way of the pin 18.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An agricultural vehicle having a chassis and a cab mounted on the chassis, wherein a fore end of the cab is mounted on the chassis for pivotal movement about a transverse axis but is prevented from moving relative to the chassis in a vertical plane, and, an aft end of the cab is resiliently supported on the chassis and is connected to the chassis by means of a linkage that permits movement of the aft end of the cab in a vertical direction towards and away from the chassis while preventing transverse movement of the aft end of the cab, wherein a Watts linkage is used to connect the aft end of the cab to the chassis.

2. An agricultural vehicle as claimed in claim 1, wherein the Watts linkage comprises a relatively short double arm lever rotatably mounted on the chassis and two relatively long levers extending in opposite directions from the ends of the double arm lever to pivot points fixed to opposite sides of the cab.

3. An agricultural vehicle as claimed in claim 2, wherein the shorter lever is vertical and the two longer levers are substantially horizontal when the vehicle is at rest on a level surface.

4. An agricultural vehicle as claimed in claim 1, wherein the mounting at the fore end of the cab is a gimbal mounting that allows the cab to roll and pitch relative to the chassis and wherein a generally transversely extending Panhard rod is connected at its one end to the chassis and at its other end to a point on the cab.

5. An agricultural vehicle as claimed in claim 4, wherein the effective length of the Panhard rod is variable to rotate the cab relative to the chassis about a longitudinal axis.

6. An agricultural vehicle as claimed in claim 5, wherein a level sensing means is provided in the cab, and means are provided for setting the length of the Panhard rod in dependence upon the output signal of the level sensing means to enable the cab to remain plumb vertical when one wheel of the vehicle is in a furrow or when driving along a banked surface.

7. An agricultural vehicle as claimed in claim 6, wherein the effective length of the Panhard rod is variable by rotating a lever or an eccentric connecting one end of the Panhard rod to the chassis or to the cab.

8. An agricultural vehicle as claimed in claim 7, wherein hydraulic shock absorbers are provided to damp oscillations of the cab on the chassis.

9. An agricultural vehicle as claimed in claim 4, wherein a spring and damper are incorporated into the Panhard rod.

10. An agricultural vehicle as claimed in claim 1, wherein rubber bushes are built into the pivots of the Watts linkage to damp oscillations of the cab on the chassis.

\* \* \* \* \*